(12) United States Patent
Prasad et al.

(10) Patent No.: US 9,723,095 B2
(45) Date of Patent: Aug. 1, 2017

(54) MULTI DELIVERY METHOD POLICY CONTROLLED CLIENT PROXY

(71) Applicant: AT&T Intellectual Property I, L.P., Atlanta, GA (US)

(72) Inventors: Vishwa Prasad, Matawan, NJ (US); Ramana V. Munagala, Holmdel, NJ (US); Gregory J. Smith, Shrewsbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 328 days.

(21) Appl. No.: 14/562,284

(22) Filed: Dec. 5, 2014

(65) Prior Publication Data
US 2016/0164992 A1    Jun. 9, 2016

(51) Int. Cl.
*H04L 29/08*    (2006.01)
*H04W 4/06*    (2009.01)
*H04L 12/18*    (2006.01)

(52) U.S. Cl.
CPC ...... *H04L 67/2814* (2013.01); *H04L 12/1854* (2013.01); *H04W 4/06* (2013.01)

(58) Field of Classification Search
CPC ... H04L 67/2814; H04L 12/1854; H04W 4/06
See application file for complete search history.

(56) References Cited

U.S. PATENT DOCUMENTS

| | | | |
|---|---|---|---|
| 7,334,257 B1 * | 2/2008 | Ebrahimi | H04L 63/08 380/255 |
| 7,769,821 B2 | 8/2010 | Brunswig et al. | |
| 2002/0143896 A1 * | 10/2002 | Hansmann | G06F 17/30902 709/218 |
| 2009/0313318 A1 * | 12/2009 | Dye | G06Q 30/00 709/202 |
| 2011/0161409 A1 | 6/2011 | Nair et al. | |
| 2011/0173345 A1 | 7/2011 | Knox et al. | |
| 2011/0214059 A1 | 9/2011 | King et al. | |
| 2011/0296048 A1 | 12/2011 | Knox et al. | |
| 2012/0221697 A1 * | 8/2012 | Sainio | H04L 67/2847 709/223 |
| 2012/0265853 A1 | 10/2012 | Knox et al. | |

(Continued)

OTHER PUBLICATIONS

Tian et al. "Multimedia Multicast Gateway Infrastructure", Beijing University of Aeronautics & Astronautics, 2001.

*Primary Examiner* — Abdullahi E Salad
(74) *Attorney, Agent, or Firm* — Akerman LLP; Michael K. Dixon; Mammen (Roy) P. Zachariah, Jr.

(57) ABSTRACT

A system for providing a multi-delivery-method policy-controlled client proxy is disclosed. The system may receive a request for a network service from a client. Based on the request for the network service, the system may detect the presence of a client proxy associated with the client. If client proxy is detected, the system may provide a data object that includes information that indicates that the client proxy is a primary source for content that may be requested by the client. The system may redirect, based on the data object, a request for the content received from the client to the client proxy. The system may then obtain, via the client proxy, the content by utilizing a delivery method that is selected based on a policy. Finally, the system may provide, via the client proxy, the content to the client.

20 Claims, 6 Drawing Sheets

(56) References Cited

U.S. PATENT DOCUMENTS

| | | |
|---|---|---|
| 2012/0265892 A1* | 10/2012 | Ma .................. H04N 21/23418 709/231 |
| 2012/0284370 A1 | 11/2012 | Hierro |
| 2013/0103791 A1 | 4/2013 | Gottdenker et al. |
| 2013/0219024 A1 | 8/2013 | Flack |
| 2013/0346472 A1* | 12/2013 | Wheeldon ........... H04L 67/2814 709/203 |
| 2014/0108496 A1* | 4/2014 | Heller ............... G06F 17/30864 709/203 |
| 2014/0150019 A1 | 5/2014 | Ma et al. |
| 2014/0372624 A1* | 12/2014 | Wang ..................... H04L 65/60 709/231 |
| 2015/0201001 A1* | 7/2015 | Cabanillas ............. G06Q 50/01 709/203 |
| 2015/0264096 A1* | 9/2015 | Swaminathan ..... H04L 65/4084 709/219 |
| 2016/0182600 A1* | 6/2016 | Swaminathan ......... H04L 67/02 709/217 |
| 2016/0344831 A1* | 11/2016 | Schneider ......... G06F 17/30861 |

\* cited by examiner

MULTI DELIVERY METHOD POLICY CONTROLLED CLIENT PROXY

FIELD OF THE INVENTION

The present application relates to technologies for content delivery, proxy services, and caching, and more particularly, to systems and methods for providing a multi-delivery-method policy-controlled client proxy.

BACKGROUND

In today's society, end users regularly utilize smartphones, tablets, laptops, computing devices, and other technologies to consume and interact with content, perform work, and perform a variety of other tasks and functions. As the number of end users and the amount of content consumption has increased in recent years, an ever-growing number of businesses have employed the use of content delivery networks so as to ensure that end users may take advantage of the high performance and high content availability that content delivery networks provide. Content delivery networks are often utilized to not only provide video content, audio content, and image content, but are also utilized to provide other types of downloadable objects, software applications, streaming media, and social media support.

While current content delivery network technologies provide many advantages to end users and businesses, such content delivery network technologies still utilize substantial network resources and include certain inefficiencies. For example, while unicast delivery methods are effective in ensuring that content is sent to each network destination identified by a unique address that requests content, unicast delivery methods often utilize substantial network resources because resources are dedicated by the network to each destination requesting the content. Additionally, while multicast and broadcast delivery methods are more efficient than unicast delivery methods, multicast and broadcast delivery methods often do not provide content that is tailored to each individual destination. Furthermore, switching between various types of content delivery methods and/or networks often disrupts an end user's content delivery experience and may require intervention by the end user. Moreover, end users often utilize applications and devices that may not utilize the same protocols or communications methods, and, as a result, may further tax the resources of content delivery networks.

SUMMARY

A system and accompanying methods for providing a multi-delivery-method policy-controlled client proxy are disclosed. In particular, the system and methods may extend the edge of a content delivery network all the way to a user device itself. This may be performed by utilizing a client proxy that may execute as a service on the user device, which may be utilized to provide content, data, and information to a client application of the user device. In order to accomplish this, the system and methods may include receiving, from the client application, a request to access a network service. For example, the network service may be an electronic programming guide (EPG) or any other type of service that may be provided by a provider. Based on the request for the network service, the system 100 and methods may determine if a client proxy associated with the client exists. If the client proxy 106 is not detected or is determined to not exist, the system and methods may include receiving a request for content from the client application of the user device and providing, via the content delivery network, the requested content to the client application of the user device.

If, however, the client proxy is detected, the system and methods may include transmitting a data object to the client application of the user device that indicates that the client proxy 106 will serve as a primary source of content for the client application of the user device. The client application may then transmit a request for content, and the system and methods may include redirecting the request for the content to the client proxy based on the data object. In certain embodiments, the request for the content may be redirected without the use of the data object. The system and methods may then include having the client proxy select a delivery method for obtaining the content for the client application. For example, the client proxy may select an optimal delivery method based on one or more network conditions occurring in the system. The delivery method may include, but not limited to, unicast, multicast, automatic multicast tunneling, multimedia broadcast multicast services (eMBMS), any other content delivery method, or any combination thereof. The client proxy may be configured to support adaptive-bit-rate functionality across the various content delivery methods. Notably, the client proxy 106, in certain embodiments, may hide the various delivery method complexities from the client application and the user.

Once the content is obtained by the client proxy, the system and methods may include caching the content in a cache of the client proxy so that the content may be stored for later delivery to the client application. In certain embodiments, the client proxy may include delivering the content directly to the client application via an interface, such as, but not limited to, a standards-based hypertext transfer protocol (HTTP) interface, other protocol-based interface, or any combination thereof, as the content is obtained by the client proxy. The client proxy may be controlled by a network operator or a device of the content delivery network. For example, the client proxy may be controlled by a network service client proxy control device, which may use one or more policies to regulate content delivery and interactions between the client proxy, the client application, and the content delivery network. Furthermore, the system and methods may include enabling application programming interfaces to be exposed to the client application to support additional functionality and features such as, but not limited to, content preload scheduling, time-shifting capabilities, providing a congestion status associated with the communications network 135 and/or the client proxy 106, and/or other features. Moreover, the system and methods may utilize the client proxy to report a user's usage statistics associated with the use of the client proxy to the content delivery network and network operator.

In one embodiment, a system for providing a multi-delivery-method policy-controlled client proxy is disclosed. The system may include a memory that stores instructions and a processor that executes the instructions to perform various operations of the system. The system may perform an operation that includes receiving, from a client, a request for a network service. The system may then perform an operation that includes detecting, based on the request for the network service, a client proxy associated with the client. If the client proxy associated with the client is detected, the system may perform an operation that includes providing, to the client, a data object including information indicating that the client proxy is a primary source for content requested by the client. The system may then perform an operation that includes redirecting a request for the content from the client to the client proxy. The request for the content may be redirected based on the data object. The system may proceed to perform an operation that includes obtaining, via the client proxy, the content by utilizing a delivery method that is selected based on a policy. Once the content is obtained, the system may perform an operation that includes providing, via the client proxy, the content to the client.

In another embodiment, a method for providing a multi-delivery-method policy-controlled client proxy is disclosed. The method may include utilizing a memory that stores instructions, and a processor that executes the instructions to perform the various functions of the method. The method may include receiving, from a client, a request for a network service. Additionally, the method may include detecting, based on the request for the network service, a client proxy associated with the client. If the client proxy associated with the client is detected, the method may include providing, to the client, a data object including information indicating that the client proxy is a primary source for content requested by the client. The method may also include redirecting a request for the content from the client to the client proxy. The request for the content may be redirected based on the data object. Furthermore, the method may include obtaining, via the client proxy, the content by utilizing a delivery method that is selected based on a policy. Finally, the method may include providing, via the client proxy, the content to the client.

According to yet another embodiment, a computer-readable device having instructions for providing a multi-delivery-method policy-controlled client proxy is provided. The computer instructions, which when loaded and executed by a processor, may cause the processor to perform operations including: receiving, from a client, a request for a network service; detecting, based on the request for the network service, a client proxy associated with the client; providing, to the client, a data object including information indicating that the client proxy is a primary source for content requested by the client; redirecting a request for the content from the client to the client proxy, wherein the request for the content is redirected based on the data object; obtaining, via the client proxy, the content by utilizing a delivery method that is selected based on a policy; and providing, via the client proxy, the content to the client.

Moreover, in certain embodiments, the systems and methods may include enabling a request for content from a client to be directly sent to the client proxy without having to redirect the request from another device to the client proxy. For example, a manifest file or other file may include a uniform resource locator or pointer that causes a request for content to go directly to the client proxy without having to first send the request for content to a device in a communications network that would have to redirect the request for the content to the client proxy. These and other features of the systems and methods for providing a multi-delivery-method policy-controlled client proxy are described in the following detailed description, drawings, and appended claims.

DETAILED DESCRIPTION OF THE INVENTION

A system 100 and accompanying methods for providing a multi-delivery-method policy-controlled client proxy 106 are disclosed, as shown in FIGS. 1-6. In particular, the system 100 and methods may extend the edge of a content delivery network to a user device by utilizing a client proxy 106 that may execute as a service on the user device so as to provide, content, data, and information to the user device. In order to accomplish this, the system 100 and methods may include receiving, from a client application of the user device, a request to access a network service. For example, the network service may be an electronic programming guide (EPG) or any other type of service that may be provided by a provider. Based on the request for the network service, the system 100 and methods may include determining if a client proxy 106 associated with the client exists. If the client proxy 106 is not detected or does not exist, the system 100 and methods may include receiving a request for content from the client application of the user device and providing, via the content delivery network, the requested content to the client application of the user device.

If, however, the client proxy 106 is detected, the system 100 and methods may include transmitting a data object to the client application of the user device that indicates that the client proxy 106 will serve as a primary source of content for the client application of the user device. The client application may then transmit a request for content, and the system 100 and methods may include redirecting the request for the content to the client proxy 106. The system 100 and methods may then include having the client proxy 106 select a delivery method for obtaining the content for the client application. For example, based on one or more network conditions in the system 100, the client proxy may select an optimal delivery method such as, but not limited to, unicast, multicast, automatic multicast tunneling, multimedia broadcast multicast services (eMBMS), any other content delivery method, or any combination thereof, for obtaining the content for the client application. Additionally, the client proxy 106 may be configured to support adaptive-bit-rate functionality across the various content delivery methods. Notably, the client proxy 106, in certain embodiments, may hide the various delivery method complexities from the client application and the user.

Once the content is obtained by the client proxy 106, the system 100 and methods may include caching the content in a cache 166 of the client proxy 106 so that the content may be stored in the cache 166 for later delivery to the client application. Additionally, the client proxy 106 may include delivering the content directly to the client application via an interface, such as a standards-based hypertext transfer protocol (HTTP) interface. In certain embodiments, the client proxy 106 may be controlled by a network operator or a device of the content delivery network. For example, the client proxy 106 may be controlled by a network service client proxy control device 130, which may use one or more policies to regulate content delivery and interactions between the client proxy 106 and the client application. Furthermore, the system 100 and methods may include enabling application programming interfaces to be exposed to the client application to support additional functionality and features such as, but not limited to, content preload scheduling and other such features. Moreover, the system 100 and methods may utilize the client proxy 106 to report a user's usage statistics associated with the use of the client proxy 106 to the content delivery network and network operator.

Figure 1:
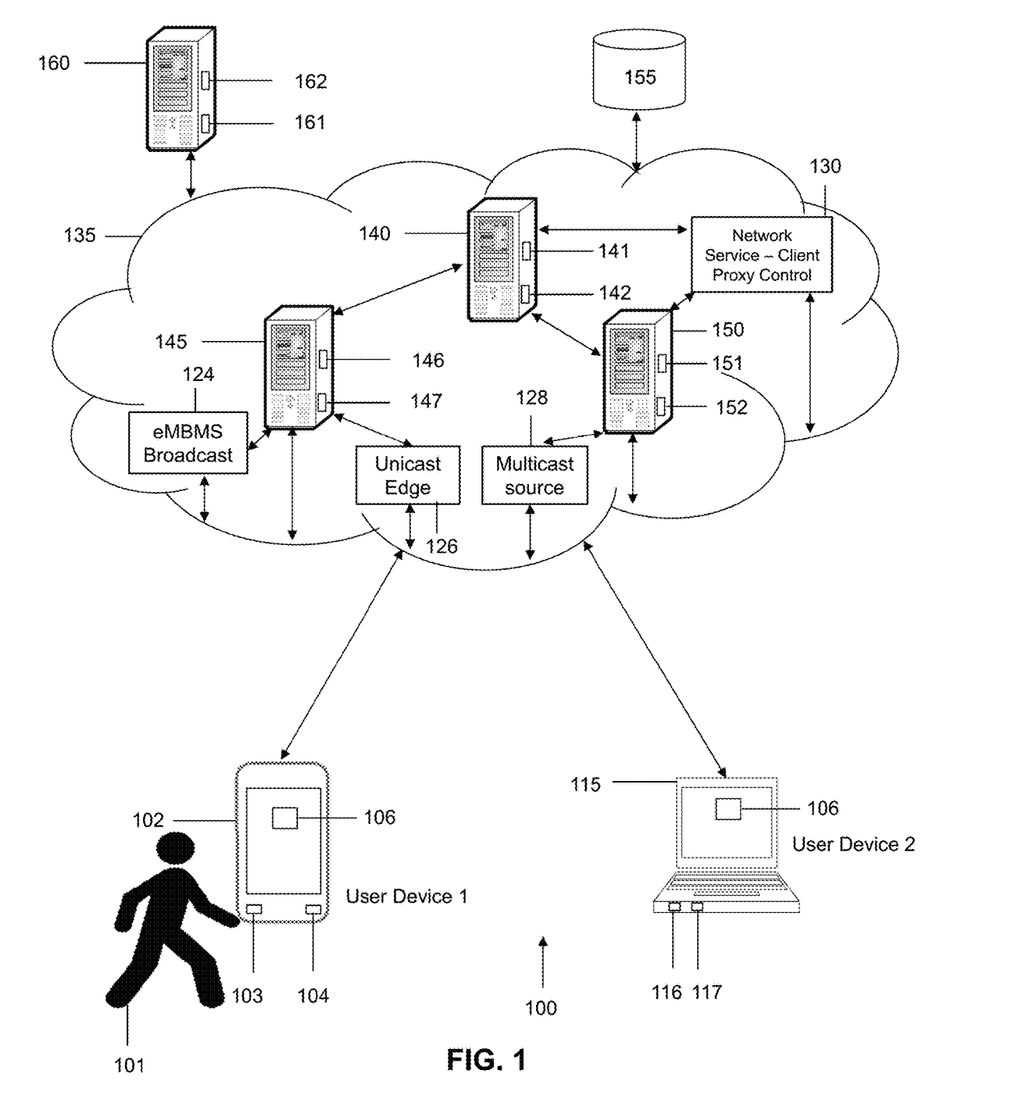
FIG. 1 is a schematic diagram of a system providing a multi-delivery-method policy-controlled client proxy according to an embodiment of the present disclosure.

As shown in FIG. 1, a system 100 for providing a multi-delivery-method policy-controlled client proxy is disclosed. The system 100 may be configured to support, but is not limited to, supporting, content delivery services, communications services, unicast services, multicast services, automatic multicast tunneling services, wireless broadcast services, eMBMS, telephone services, cloud computing services, voice-over-internet protocol services (VoIP), software as a service (SaaS) applications, gaming applications and services, productivity applications and services, mobile applications and services, and any other computing applications and services. The system 100 may include a user 101 that may utilize first user device 102, the second user device 115, or both, to access content, data, and services, to initiate and participate in communications sessions, or to perform a variety of other functions. For example, the user 101 may utilize a web browser installed on the first user device 102 to access content that is supplied by a content provider that utilizes communications network 135 to deliver its content.

In certain embodiments, the first user device 102 and the second user device 115 may be computers, servers, mobile devices, gateways, smartphones, computer tablets, phablets, set-top-boxes, or any other computing devices. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. In FIG. 1, first user device 102 is illustratively shown as a smartphone device. Similarly, the second user device 115 may include a memory 116 that includes instructions, and a processor 117 that executes the instructions from the memory 116 to perform various operations that are performed by the second user device 115. The processor 117 may be hardware, software, or a combination thereof. In FIG. 1, second user device 115 is illustratively shown as a laptop.

The user 101 may utilize the first user device 102 and the second user device 115 to request and receive content, participate in communications sessions, access various types of software applications, perform work, perform any types of computing functions, or any combination thereof. For example, the user 101 may utilize the first user device 102 and the second user device 115 to access and obtain various types of content and services, such as, but not limited to, video content, audio content, web content, text content, speech-related services, gaming services, productivity services, work-related services, or any combination thereof. Additionally, the user 101 may make telephone calls, conduct chat sessions, send instant messages, send or receive data, or perform any other types of communications using the first user device 102 and the second user device 115. Furthermore, user 101 may utilize the first user device 102 and the second user device 115 to perform a variety of other tasks and functions. For example, the first user device 102 and the second user device 115 may be utilized to interact with any type of software applications, hardware, or any combination thereof.

In certain embodiments, the first user device 102, the second user device 115, or both, may include a software application that may be a cloud-based application, gaming application, an internet-based application, a browser application, a mobile application, a productivity application, a video application, a music application, a social media application, a financial application, a news application, any other type of application, or a combination thereof. The software application may be client 110, client 118, or a combination thereof. For example, the client 110 may be a software program, such as but not limited to, a media streaming application that can access an EPG to provide requested video or other content to the user 101 using the first user device 102, a gaming application for providing access to gaming content, any other type of application, or any combination thereof. Client 118 may be a software program that is similar to client 110, but may be associated with second user device 115. In certain embodiments, at least a portion of the software application and/or clients 110, 118 may be configured to execute directly on the first and second user devices 102, 115, however, in other embodiments, the software application and/or clients 110, 118 may be configured to execute on other devices and components in the system 100. For example, at least a portion of the software application and/or clients 110, 118 may be configured to execute on server 160, on a device in communications network 135, or any combination thereof. As another example, in certain embodiments, the software application and/or clients 110, 118 may be configured to execute on modems, routers, set-top-boxes, gateways, televisions, dongles, or any other appropriate device.

In certain embodiments, the first user device 102 and the second user device 115 may include a client proxy 106, which may be a software application that may run as a service on the first and second user devices 102, 115 respectively. The client proxy 106 may be utilized to serve content requests received from the client 110, 118, or both. In particular, content requests coming from the client 110, 118, or both, that may normally be serviced by the content delivery services of the communications network 135 may be redirected to the client proxy 106 so that the client proxy 106 may obtain the requested content and provide the obtained content to the client 110, 118, or both. The client proxy 106 may be discoverable by the communications network 135 and may be configured to make any obtained content and data available to any application, such as client 110 or client 118, through an interface, such as an HTTP interface. The client proxy 106 may also be configured to obtain content requested by the clients 110, 118 via any number of delivery methods, such as, but not limited to, unicast, multicast, automatic multicast tunneling, or eMBMS broadcast/multicast.

Additionally, the client proxy 106 may utilize one or more application programming interfaces (APIs) to obtain network state information associated with the communications network 135, such as, but not limited to, network loads, network bandwidth, network utilization, or any other network state information. The APIs may also be utilized by the client proxy 106 to request additional bandwidth from the communications network 135 or another network resource for a selected period of time. The client proxy 106 may also provide a cache 166 for preloading obtained content, caching content, or for other purposes. Also, the client proxy 106 may obtain one or more policies 162 from the communications network for optimizing content delivery, selecting a network for obtaining requested content, conserve battery power, or any other policy. The client proxy 106 may expose APIs to the clients 110, 118 to provide additional functions, such as, but not limited to, content preload scheduling or other features. The client proxy 106 may also log information associated with the content requested, the clients 110, 118, feedback from the user 101 regarding the operation of the client proxy 106, or any other desired information. Furthermore, the client proxy 106 may assist in network resource management, assist in providing an additional layer of security for protecting the first and second user devices 102, 115, assist in providing for failure management in conjunction with the network service client proxy control device 130, and may be configured to insert itself into a client request path based on one or more policies 162. The client proxy 106 may be directly installed onto the first and second user devices 102, 115, however, in certain embodiments, the client proxy 106 may be installed on another device in the system 100, but may be accessed by the first and second user devices 102, 115. For example, the client proxy 106 may be installed and/or executed on modems, routers, set-top-boxes, gateways, televisions, dongles, or any other appropriate device.

Figure 2:
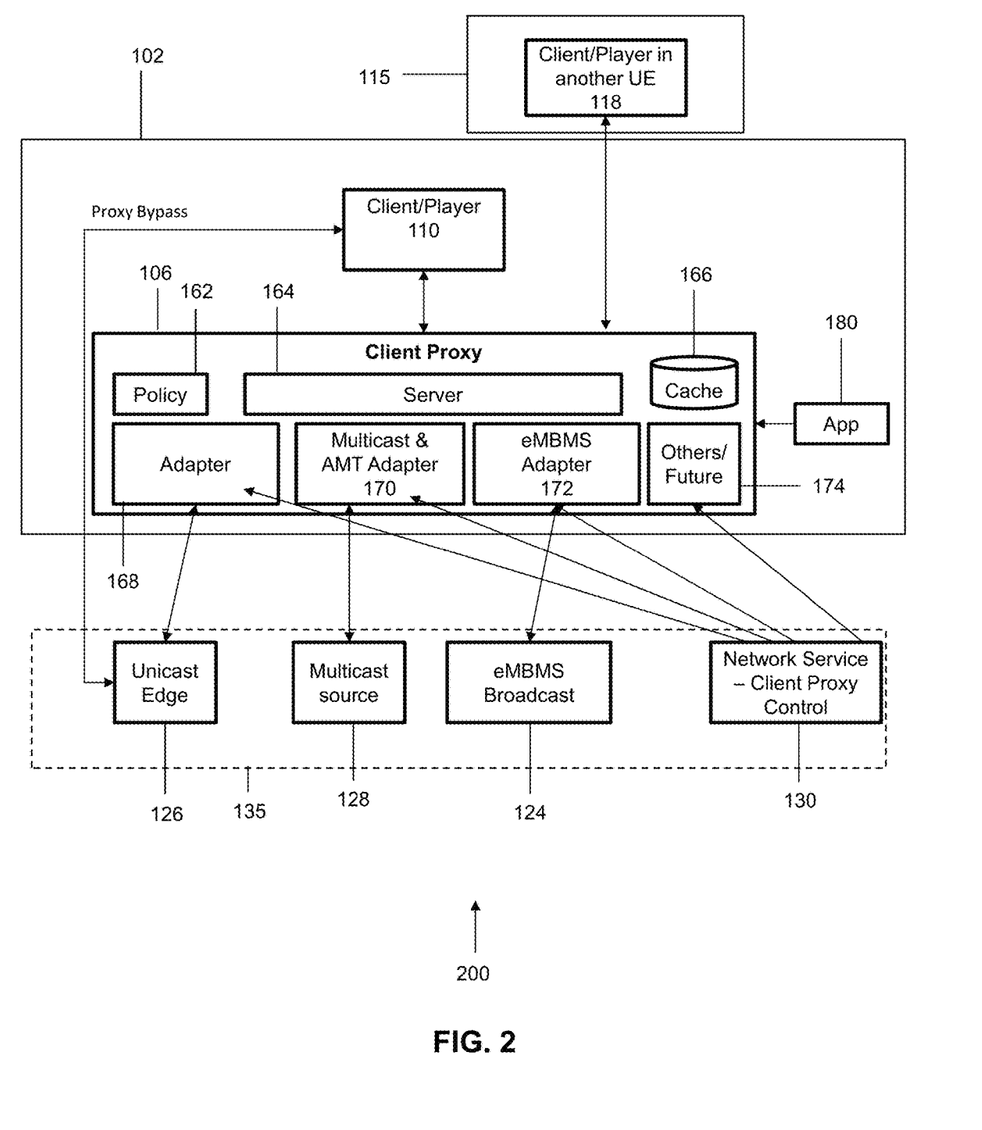
FIG. 2 is a schematic diagram illustrating a sample architecture for the client proxy as shown in FIG. 1.

In FIG. 2, a sample architecture 200 illustrating the various components of the client proxy 106 is schematically shown. The client proxy 106 may reside in the first and second user devices 102, 115, and may include one or more policies 162 for regulating how the client proxy 106 operates, a server 164, a cache 166, an adapter 168, a multicast and/or automatic multicast tunneling adapter 170, an eMBMS adapter 172, and/or any other adapters 174 for any other types of services. For example, adapter 174 may be an adapter that is adapted for satellite communications or other types of communications. The server 164 may be a server that may process requests, such as those received by the first and second user devices 102, 115. For example, the server 164 may be a HTTP server, a UDP protocol based server, a multicast server, a custom server, any protocol-based server, or any combination thereof, which may be utilized to process requests from the first and second user devices 102, 115. The cache 166 may be a memory storage location within the client proxy 106 and, in certain embodiments, may correspond to memory 103, memory 116, and/or a memory in an external device connected to first and second user devices 102, 115, or connected to the communications network 135 and/or any other network. In certain embodiments, the adapters 168, 170, 172, and 174 may provide interfaces to various hardware components of the first user device 102 so that the hardware components may be accessed and/or controlled. Second user device 115 may include similar adapters and components as utilized by first user device 102. The first and second user devices 102, 115 may also include one or more applications 180, which may also interact with the client proxy 106. The application 180 may be any type of software application such as, but not limited to, a smartphone application or any other type of application.

In addition to the first and second user devices 102, 115, the system 100 may include a unicast edge device 126, which may be a server or other computing device configured to conduct unicast communications with the various devices in the system 100. The unicast edge device 126 may be utilized to deliver content via one or more unicast communications to the client proxy 106, the clients 110, 118, or to any other device in the system 100. In certain embodiments, the unicast edge device 126 may communicate with adapter 168 so as to assist in conducting unicast communications with the client proxy 106. The system 100 may also include a multicast source device 128, which may be a computing device that may be utilized to deliver content to the various devices in the system 100 through the use of multicast communications. The multicast source device 128 may communicate with the multicast and/or automatic multicast tunneling adapter 170 to assist in conducting multicast communications with the client proxy 106. Furthermore, the system 10 may include an eMBMS broadcast device 124, which may be a computing device that may be utilized to deliver content through the use of eMBMS or other wireless broadcast communications with the various devices in the system 100. In certain embodiments, the eMBMS broadcast device 124 may communication with the eMBMS adapter 172 so as to assist in conducting wireless broadcast communications with the client proxy 106. In certain embodiments, the unicast edge device 126, the multicast source device 128, and the eMBMS broadcast device 124 may reside within communications network 135.

The system 100 may further include a network service client proxy control device 130, which may be utilized by the system 100 to control the client proxy 106. The network service client proxy control device 130 may be a server or any other type of computing device, and may include a memory that stores instructions and a processor that executes the instructions from memory to perform the operations of the network service client proxy control device 130. In certain embodiments, the network service client proxy control device 130 may reside in the communications network 135 and may be configured to activate and/or deactivate the client proxy 106. Additionally, the network service client proxy control device 130 may store one or more policies 162, which may be transmitted to the client proxy 106 whenever needed. As policies 162 change, the network service client proxy control device 130 may update the policies 162 and transmit the new policies 162 to the client proxy 106. In certain embodiments, the policies 162 may be transmitted to the client proxy 106 through a multicast channel that the client proxy is listening to, and by utilizing multicast source device 128.

The policies 162 may be utilized to dictate how and when the client proxy 106 operates. In particular, the policies 162 may indicate under what network conditions that client proxy 106 may operate and obtain content. For example, if many devices in the system are requesting the same content as the first user device 102, a policy 162 may indicate that the client proxy 106 should utilize a multicast delivery method to obtain the content for the first user device so as to ensure that minimal network resources are utilized. As another example, a policy 162 may indicate that for certain content/URLs the client proxy 106 may only utilize a unicast delivery method to obtain content for the first user device 102. As further examples, policies 162 may dictate how much of the cache 166 and/or the memories 103, 116 may be utilized by the client proxy 106, and other policies 162 may dictate how content obtained by the client proxy 106 may be manipulated or adjusted. Notably, any number or types of policies 162 may be utilized, and may include, but are not limited to, a policy 162 that indicates that the client proxy 106 may only obtain content for a client 110, 118 when the battery level of the first and second user devices 102, 115 is at a threshold level, a policy 162 indicating that the client proxy 106 should only operate when the first and/or second user devices 102, 115 are in an idle state, a policy 162 indicating that the client proxy 106 should operate only when the first and/or second user devices 102, 115 are plugged into A/C power sources, a policy 162 that indicates that the client proxy 106 should operate only when certain types of activities are being performed on the first and/or second user devices 102, 115, a policy 162 that indicates when a particular content delivery method may be utilized, a policy 162 that indicates a type of network that the client proxy 106 should use, a policy 162 that indicates what content delivery method should be used based on a threshold level of network resources being used in the communications network 135, a policy 162 that indicates under what conditions the delivery method should be switched, any other policy 162 for controlling the client proxy 106, a policy 162 that indicates a schedule for the client proxy 106 to operate, a policy 162 that indicates what delivery method or what type of communications network 135 should be used based on a demand threshold for certain content, or any combination thereof.

The network service client proxy control device 130 may by itself or in conjunction with the devices in the communications network 135 be utilized to detect the presence of the client proxy 106 in a number of ways. For example, the client proxy 106 may be detected based on a fixed location, such as an internet protocol address, and a port at which the client proxy 160 executes on the first user device 102 or second user device 115. As another example, the client proxy 106 may also be detected if the client 110 is a custom client that is preconfigured with one or more addresses and/or port numbers of possible locations for the client proxy 106. Based on such a configuration, the client 110 may utilize a request, such as a HTTP request, at such addresses and/or ports to detect the presence of the client proxy 106 and to connect to the client proxy 106. As a third example, the client proxy 106 may be detected based on a JavaScript or other script that contains one or more addresses and/or port numbers that may be sent to a client 110 by the unicast edge device 126, the servers 140, 145, 160, or other appropriate device when the client 110 requests a particular network service. The script may make a request, such as a HTTP request, to discover the location of the client proxy 106, and transmit the location back to the communications network 135 and network service client proxy control device 130, or other suitable device in the communications network 135. As a fourth example, the client proxy 106 may be configured to listen to a multicast control channel. A request may be sent by the communications network 135 via the multicast control channel to request the location of the client proxy 106. The client proxy 106 may be detected by the network service client proxy control device 130 based on a response from the client proxy 106. As a fifth example, the client proxy 106 may be registered with a network service and may provide one or more characteristics and information when the client proxy 106 is initiated or when any of the client proxy's 106 characteristics, such as an internet protocol address, change, or any combination thereof.

The network service client proxy control device 130 may also harvest information from the client proxy 106. For example, the network service client proxy control device 130 may obtain usage statistics and information associated with the client proxy 106, such as, but not limited to, how frequently the client proxy 106 is utilized, what type of content the client proxy 106 obtains and/or caches, user feedback regarding an effectiveness of the client proxy 106 in providing content or other services, when the client proxy 106 is active, when the client proxy 106 is inactive, when the client proxy 106 fails, when the client proxy 106 is overloaded, which network conditions affect the operation of the client proxy 106, a volume of requests handled by the client proxy, 106 what applications and/or clients 110, 118 utilize the client proxy 106, any other type of client proxy 106 information, information identifying the first and second user devices 102, 115, information indicating a capacity of the first and second user devices 102, 115, any information associated with the first and second user devices 102, or any combination thereof. Additionally, the network service client proxy control device 130 may enforce various terms and conditions associated with information sent by the client proxy 106 to the network service client proxy control device 130 or to any other device. For example, based on policies 162, the client proxy 106 may be prevented from obtaining and/or sending usage statistics and information associated with certain types of content, information associated with the user, information associated with user habits, information blocked based on user preferences, or any other type of information.

Notably, the functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. In certain embodiments, the server 140 may be a content delivery network edge proxy cache server that may serve as an edge device for content delivery services provided by the communications network 135. Additionally, the server 145 may include a memory 146 that includes instructions, and a processor 147 that executes the instructions from the memory 146 to perform various operations that are performed by the server 145. In certain embodiments, the server 145 may be a manifest server or other similar server that may store and transmit manifest files or other files that may include one or more pointers for indicating where content may be obtained from. For example, the manifest file may include one or more pointers indicating that certain content should be obtained via client proxy 106 instead of directly from the communications network 135. Furthermore, the server 150 may include a memory 151 that includes instructions, and a processor 152 that executes the instructions from the memory 151 to perform various operations that are performed by the server 150. In certain embodiments, the server 150 may be a domain name server and may translate various types of addresses, such as word-based addresses, into internet protocol or other desired addresses. The processors 142, 147, and 152 may be hardware, software, or a combination thereof. In certain embodiments, the servers 140, 145, and 150 may be network servers, routers, gateways, computers, mobile devices or any other suitable computing device.

The communications network 135 of the system 100 may be a content delivery network and may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. In certain embodiments, the communications network 135 may support eMBMS broadcast capabilities, unicast capabilities, multicast capabilities, automatic multicast tunneling capabilities, any other content delivery capabilities, or any combination thereof. The communications network 135 may also include and be connected to a cloud computing network, a wireless network, an ethernet network, a satellite network, a broadband network, a cellular network, a private network, a cable network, the Internet, an internet protocol network, a multiprotocol label switching (MPLS) network, a content distribution network, a short-range wireless network (e.g. Bluetooth), a fiber optic network, a WiFi network, or any combination thereof. In one embodiment, the communications network 135 may be part of a single autonomous system that is located in a particular geographic region, or be part of multiple autonomous systems that span several geographic regions.

The database 155 of the system 100 may be utilized to store and relay information that traverses the system 100, cache content that traverses the system 100, store data about each of the devices in the system 100 and perform any other typical functions of a database. In one embodiment, the database 155 may be connected to or reside within the communications network 135. Additionally, the database 155 may include a processor and memory or be connected to a processor and memory to perform the various operation associated with the database 155. In certain embodiments, the database 155 may be connected to servers 140, 145, and 150, server 160, the first user device 102, the second user device 115, the eMBMS broadcast device 124, the unicast edge device 126, the multicast source device 128, the network service client proxy control device 130, or any combination thereof. The database 155 may also store communications traversing the system 100, store information relating to the network conditions occurring in the communications network 135, store manifest files or other files containing pointers to the client proxy 106, store information relating to content delivery methods, store information identifying the client proxy 106, store internet protocol addresses associated with the client proxy 106, store information associated with the first user device 102 and the second user device 115, store information associated with the eMBMS broadcast device 124, unicast edge device 126, multicast source device 128, and network service client proxy control device 130, store user preferences, store information about the user 101, store any information traversing the system 100, store information relating to the user's 101 feedback regarding the client proxy 106, or any combination thereof. Furthermore, the database 155 may be configured to process queries sent to it by any device in the system 100 or otherwise.

Figure 3:
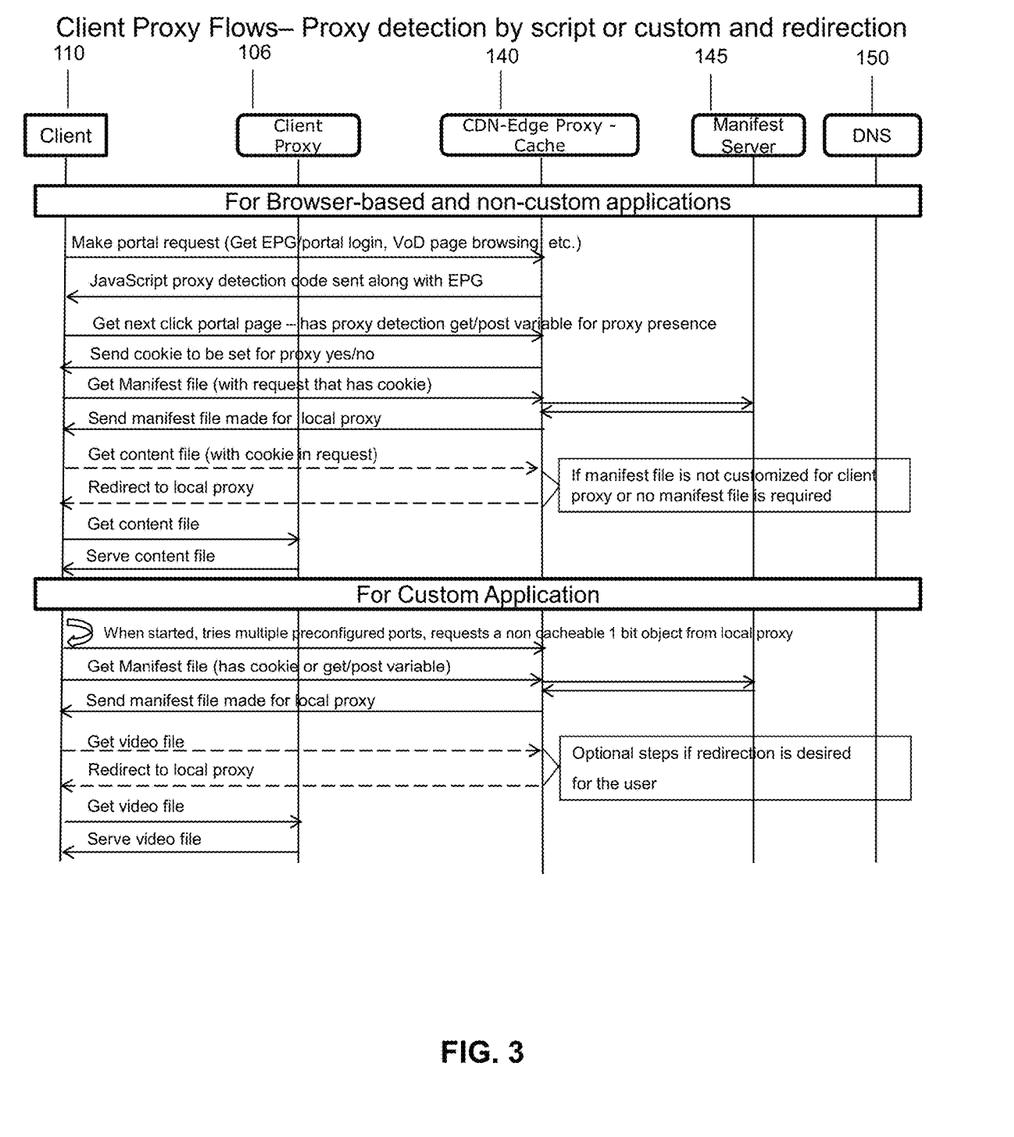
FIG. 3 is a schematic diagram illustrating sample client proxy flows for browser based applications, non-custom applications, and custom applications.

Operatively, the system 100 may provide for a multi-delivery-method policy-controlled client proxy 106 in the following manner. In a first example use case scenario as shown in FIG. 3, the user 101 may utilize client 110 on first user device 102 to log onto a content provider's portal and transmit a request for a network service, such as an EPG. In this example scenario, the client 110 may be a browser-based application, a non-custom application that is not customized for network operator associated with the communications network 135, or any combination thereof. Upon receiving the request for the network service, the system 100 may detect the presence of the client proxy 106, such as by utilizing one or more of the methodologies described herein. For example, the server 140 may transmit a JavaScript proxy detection code along with the requested EPG to the client 110. The JavaScript may attempt to try preconfigured ports, request a non-cacheable one-bit object from the client proxy 106, or perform any other action to detect the presence of the client proxy 106. Once the client proxy 106 is detected or is not detected, a cookie or other data object may be set, such as via a roundtrip to a content delivery network proxy detection page, within the client 110 to indicate the presence of the client proxy 106. For example, the cookie may be set with a YES or a NO to indicate whether the client proxy 106 has been detected. In certain embodiments, the client 110 may set additional information in the cookie. For example, the client 110 may set information in the cookie that includes an identifier for the client 110, parameters associated with the various features, capabilities, and functions of the client 110, information associated with the capabilities and functions of the client proxy 106, or any other desired information.

After the cookie is set, the user 101, via the client 110, may select a link for a particular video program of interest. The client 110, may also send the cookie with the selection. In response, the server 145 or any other appropriate device may serve a manifest file for the requested video program to the client 110. In certain embodiments, the server 145 may provide a generic manifest file that includes one or more pointers (e.g. URLs or other identifiers) that indicate where the client 110 may access the content. In other embodiments, the server 145 may adjust the generic manifest file to be specifically tailored for the client proxy 106 and/or the client 110, such as based on the information set in the cookie. For example, in one embodiment, the communications network 135 may respond with a version of the manifest file that is tailored to the client proxy 106 and/or client 110, which includes a pointer to the client proxy 106 as a primary source of the requested video program. For dynamic adaptive streaming (DASH)-type manifests or other similar manifests, the manifest file may point to the communications network 135 itself as a secondary source of the requested video program if the client proxy 106 fails. In another embodiment, a manifest pointing to the communications network 135 may be returned. If a tailored manifest file is provided to the client 110, the client 110 may directly request the video program from the client proxy 106 without having to send a request for the video program to the communications network 135. The client proxy 106 may obtain the content by selecting one or more delivery method and networks based on one or more network conditions occurring in the system 100, and then provide the content to the client 110.

If, however, a generic manifest file is provided or no manifest file is required or needed, the client 110 may transmit a request to play the video program to the communications network 135 and the request may be redirected to the client proxy 106, such as by using server 140. The request may be redirected to the client proxy 106 based on the generic manifest file, based on the communications network 135 directly redirecting the client 110 to the client proxy 106 based on the cookie in the request, based on other redirection means, or any combination thereof.

Once the request is redirected to the client proxy 106, the client proxy 106 may detect if multicast, eMBMS, automatic multicast tunneling, or other delivery method capability is present in the system 100. If there is no native capability for multicast, the client proxy 106 may obtain service and session information from a network service, and may then utilize automatic multicast tunneling. The service and session information may be obtained from the network service client proxy control device 130. If no multicast, eMBMS, or automatic multicast tunneling is available, then the client proxy 106 may obtain the requested video program from the communications network 135 and serve the content on-demand to the client 110. If, however, multicast or eMBMS is available, then the client proxy 106 may be configured to join a multicast, eMBMS, and/or automatic multicast tunneling session, and then serve the requested video program to the client 110 through the session. Notably, this scenario may be utilized in the context of adaptive-bit-rate streaming.

In a second example scenario, the client 110 may be a custom application that may be customized by the network operator of the communications network 135. In this scenario, as shown at the bottom half of FIG. 3, when the client 110 is initiated or at another desired time, the network service client proxy control device 130 and/or the communications network 135 may automatically detect the presence of the client proxy 106 because the client 110 is a custom application. The client proxy 106 may be detected through preconfigured ports for the client proxy 106, by requesting a non-cacheable one-bit object from the client proxy 106 that may be triggered based on an EPG request/response transaction, other request/response transaction, or through other detection means. The client 110 may request a manifest file from the server 140. The request may include a cookie or a get/post variable that includes information identifying or associated with the client proxy 106, the client 110, or any combination thereof. The request may be sent to the server 145, which may tailor a generic manifest file to create an adjusted manifest file based on the information in the cookie and/or the get/post variable. The server 140 may obtain the adjusted manifest file associated with the client proxy 106 from server 145, and then transmit the manifest file to the client 110. The client 110 may transmit a request for the video file or other file directly to the client proxy based on the adjusted manifest file. In certain embodiments, the client 110 may transmit a request for the video file or other file to the server 140, and the server 140 may redirect the request to the client proxy 106. The client 110 may then obtain the content from the client proxy 106.

Figure 4:
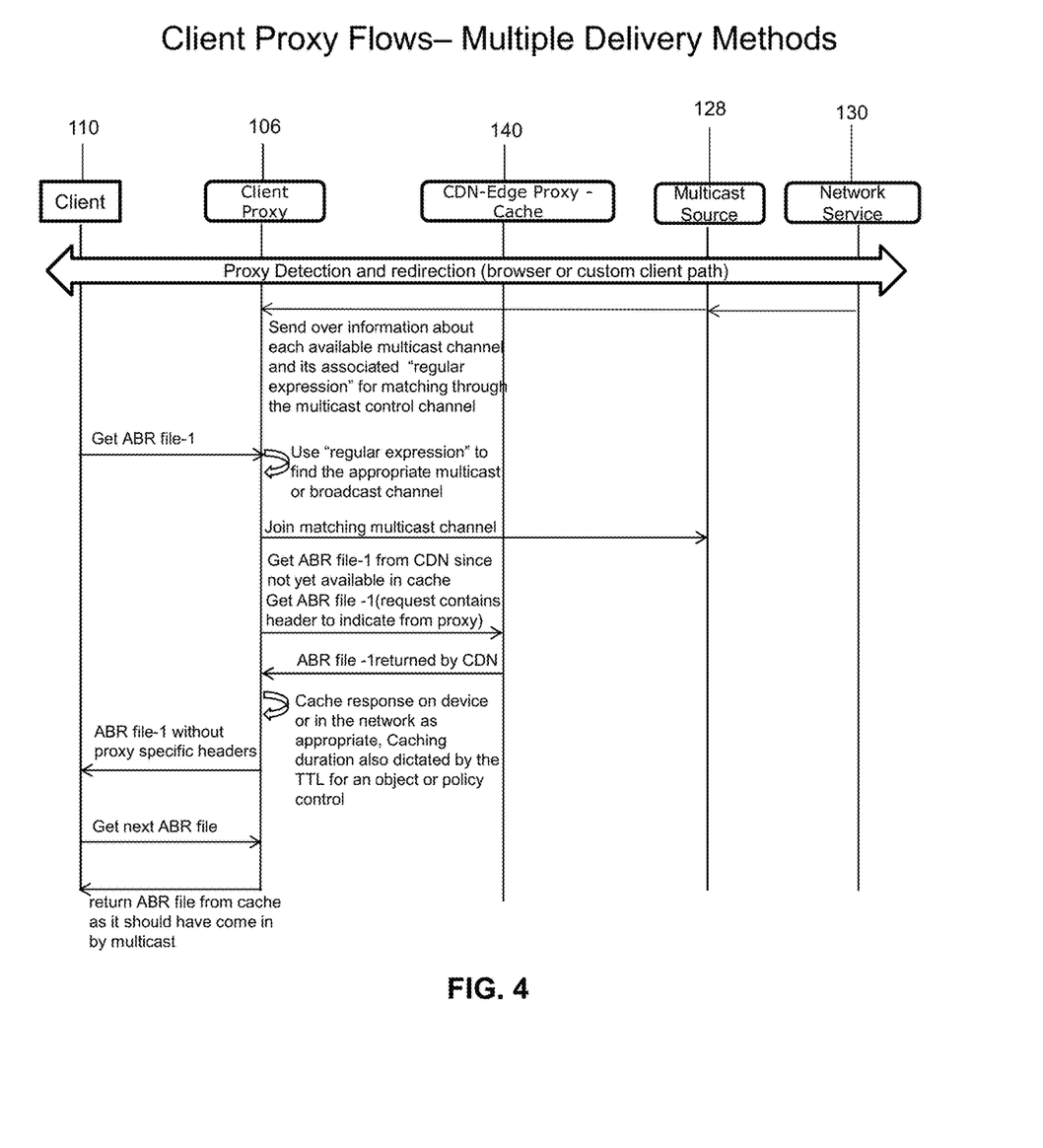
FIG. 4 is a schematic diagram illustrating client proxy flows in the context of adaptive bit rate content.

In certain embodiments and referring now also to FIG. 4, the system 100 may be adapted to provide for adaptive-bit-rate switching. In such embodiments, several assumptions may be made. For example, a content segment may be transmitted over multicast at the same time when it is made available to caches of the communications network 135, such as server 140. Additionally, the availability time for the content segment in a manifest file may be the sum of the clock time at the start of a multicast transmission and the segment duration. This may allow for the content segment file to be received in the server 140 and in the client proxy 106 before a request for the content is made. Furthermore, the clients 110, 118 may be synchronized with a network clock associated with the communications network 135. In an example scenario, the clients 110, 118 may request different bit-rate content from the communications network 135 over unicast, for example. In certain embodiments, only a subset of the requested bit-rate content may be available through multicast or broadcast (e.g. eMBMS). The network service client proxy control device 130, or other servers in the communications network 135, may transmit information about each available multicast channel and its associated "regular expression" to the client proxy 106. The regular expression may be a string or other identifier for identifying a particular multicast channel. When the client proxy 106 receives a request (e.g. URL) for content from the clients 110, 118, the client proxy 106 may apply the regular expression to the uniform resource locator for each multicast channel the client proxy 106 has information about. The client proxy 106 may select the multicast channel that matches the regular expression. The client proxy 106 may join the selected multicast channel and may connect with multicast source device 128 in a multicast session.

Once the client proxy 106 is joined to the multicast channel, the client proxy 106 may start receiving packets corresponding to the content, while simultaneously using unicast to provide the content to the clients 110, 118 that requested the content. When the client proxy 106 receives file information for the content contained in the multicast channel, the client proxy 106 may again match the file name against the uniform resource locator using the policies 162 associated with the client proxy 106. If the client proxy 106 determines that the file name matches for client requests in the immediate future, the client proxy 106 may start receiving files over multicast and deposit the received files in the cache 166. When requesting the content, the client proxy 106 may obtain the content using requests that include headers that indicate that the request is from the client proxy 106 so that no redirection of the requests needs to take place. The files may be stored in the cache 166 for a duration that is dictated based on a time-to-live (TTL) for an object or policy control. The files may also be stored in the cache 166 based on cache control headers. The files including the segments may then be sent to the clients 110, 118 without the proxy-specific headers. The clients 110, 118 may then request a next segment for the content, the client proxy may obtain the next segment from the cache 166, and the client proxy 106 may serve the next segment to the clients 110, 118. The client proxy 106 may repeat the process for subset content segment requests until all content segments are obtained. Notably, the client proxy 106 may obtain each of the segments of the requested content via the multicast channel, however, in certain instances, the client proxy 106 may obtain portions of the content from the server 140. For example, the server 140 may provide segments of the content to the client proxy before the multicast session is set up, if a packet associated with a segment was dropped during the multicast session, if a packet associated with a segment contains an error, for any other desired reason, or any combination thereof.

Notably, as shown in FIG. 1, the system 100 may perform any of the operative functions disclosed herein by utilizing the processing capabilities of server 160, the storage capacity of the database 155 or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving a request for a network service from the client 110, detecting whether a client proxy 106 exists, receiving requests for content from the client 110, providing data objects indicating that the client proxy 106 is a primary source of content, providing the content in response to a request for content, redirecting requests for content to the client proxy 106, selecting content delivery methods for delivering the content, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 115, an eMBMS broadcast device 124, a unicast edge device 126, a multicast source device 128, a network service client proxy control device 130, a communications network 135, a server 140, a server 145, a server 150, a server 160, and a database 155. However, the system 100 may include multiple first user devices 102, multiple second user devices 115, multiple eMBMS broadcast devices 124, multiple unicast edge devices 126, multiple multicast source devices 128, multiple network service client proxy control devices 130, multiple communications networks 135, multiple servers 140, 145, 150, and 160, multiple databases 155, or any number of any of the other components in the system 100. Furthermore, in one embodiment, substantial portions of the functionality and operations of the system 100 may be performed by other networks and systems that may be connected to system 100.

Figure 5:
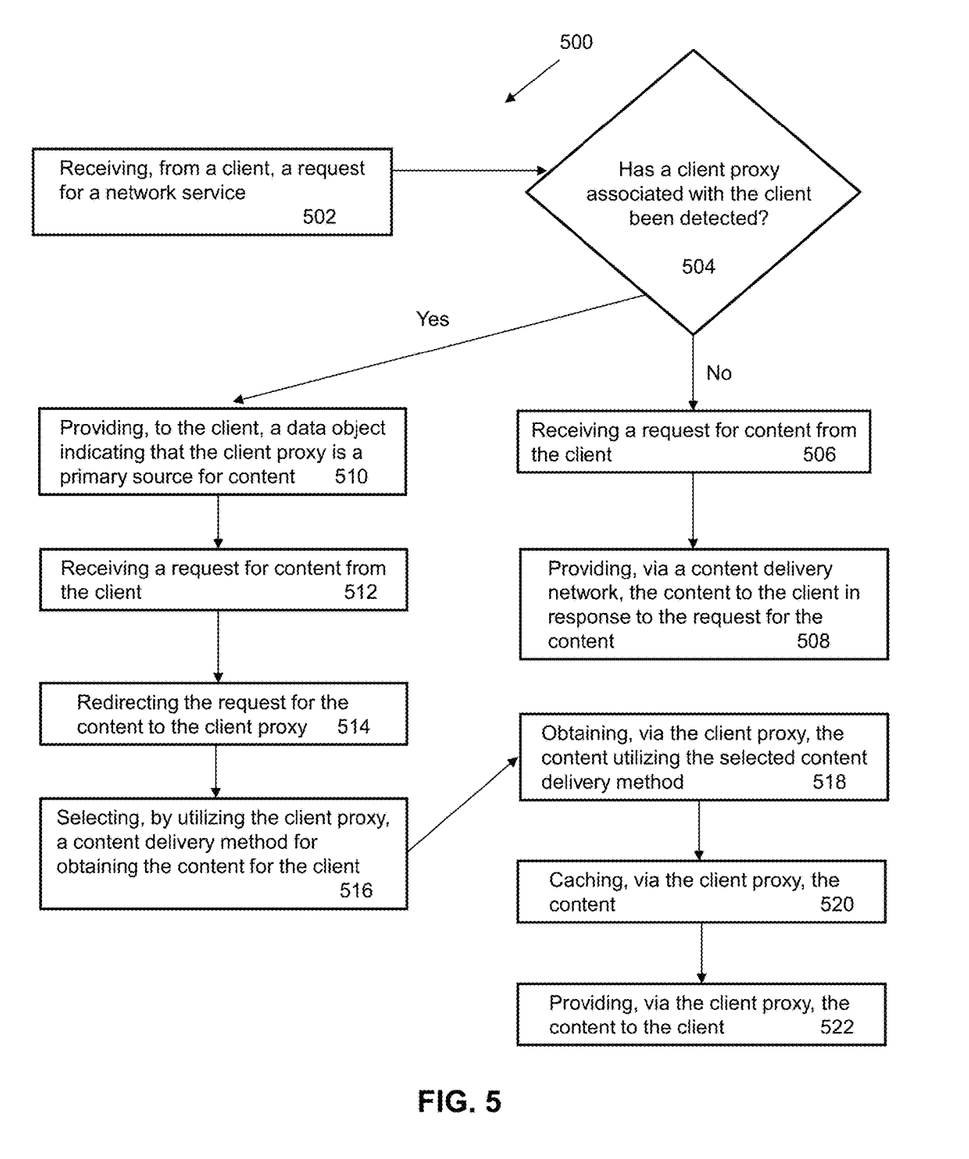
FIG. 5 is a flow diagram illustrating a sample method for providing a multi-delivery-method policy-controlled client proxy according to an embodiment of the present disclosure.

As shown in FIG. 5, an exemplary method 500 for providing a multi-delivery-method policy-controlled client proxy is schematically illustrated, and may include, at step 502, receiving from a client, such as client 110, a request for a network service. The client, for example, may be a browser, a media player, a software application, firmware, or any combination thereof that executes on a client device, such as first user device 102. The network service may include, but is not limited to, a portal request for an electronic programming guide, a request for a video-on-demand page for browsing available content, a request to access a user account page, a request for accessing any type of network service, or any combination thereof. In certain embodiments, the request for the network service may be transmitted by the first user device 102, the client 110, the second user device 120, the client 123, or any combination thereof. In certain embodiments, the request for the network service may be received by the network service client proxy control device 130, the servers 140, 145, 150, 160, any combination thereof, or by any other appropriate device.

At step 504, the method 500, may include determining whether a client proxy 106 associated with the client 110 has been detected in response to the request for the network service. In certain embodiments, the determination may be performed by the network service client proxy control device 130, the servers 140, 145, 150, 160, any combination thereof, or by any other appropriate device. The client proxy 106 may be detected utilizing a variety of different methods. As a first example, the client proxy 106 may be detected based on a fixed location, such as an internet protocol address, and a port at which the client proxy 160 executes on the first user device 102. As a second example, the client proxy 106 may also be detected if the client 110 is preconfigured with one or more addresses and/or port numbers of possible locations for the client proxy 106. Based on such a configuration, the client 110 may utilize a request, such as a HTTP request, at such addresses and/or ports to detect the presence of the client proxy 106 and to connect to the client proxy 106. As a third example, the client proxy 106 may be detected based on a JavaScript or other script that contains one or more addresses and/or port numbers that may be sent to a client 110 when the client 110 requests the network service to get content. The script may make a request, such as a HTTP request, to discover the location of the client proxy 106, and transmit the location back to the communications network 135. As a fourth example, the client proxy 106 may be configured to listen to a multicast control channel. A request may be sent by the communications network 135 via the multicast control channel to request the location of the client proxy 106. The client proxy 106 may be detected based on a response from the client proxy 106. As a fifth example, the client proxy 106 may be registered with a network service and may provide one or more characteristics and information when the client proxy 106 is initiated, when any of the client proxy's 106 characteristics, such as an internet protocol address, change, or any combination thereof.

If the client proxy 106 has not been detected, the method 500 may include, at step 506, receiving a request for content from the client 110. The request for the content may be received by the servers 140, 145, 150, 160, any combination thereof, or by any other appropriate device. In certain embodiments, the request may be received by the network service client proxy control device 130, particularly if the network service client proxy control device 130 is capable of redirecting requests received from the client 110 to the client proxy 106. At step 508, the method 500 may include providing, such as via the communications network 135, the content to the client 110 in response to the request for the content without using a client proxy 106. At step 508, the content may be provided by utilizing the servers 140, 145, 150, 160, any combination thereof, or by any other appropriate device. In certain embodiments, the content may be provided to the client 110 by utilizing a content delivery method that is tailored based on the one or more network conditions occurring in the communications network 135. For example, the content delivery method may be, but is not limited to, a unicast delivery method, a multicast delivery method, an eMBMS delivery method, a broadcast delivery method, a satellite delivery method, any other delivery method, or any combination thereof. As an example, if many users are requesting the same content, the content may be delivered by utilizing a multicast delivery method to ensure optimal usage of network resources in the communications network 135.

If, however, the client proxy 106 has been detected, the method 500 may include, at step 510, providing, to the client 110, a data object that may be utilized to indicate that the client proxy 106 is a primary source of content for the client 110. In certain embodiments, the data object may be a cookie or other data object that may include information indicating that the client 110 should obtain content from the client proxy 106. For example, the the data object may include information that indicates that content should be obtained from the client proxy 106 instead of from server 140, which may be a content delivery network edge proxy cache. In certain embodiments, the data object may be provided by utilizing the servers 140, 145, 150, 160, any combination thereof, or by any other appropriate device. In certain embodiments, the client 110 may set information in the data object that includes an identifier for the client 110, parameters associated with the client 110, and/or information indicating the presence of the client proxy 106. The client 110 may transmit a request for a manifest file, and the request may include the data object. The request for the manifest file may be received by the server 140, which may obtain a manifest file from the server 145 that may be specifically tailored to the client 110 based on the information set in the data object. The manifest file may be provided to the client 110 and may include one or more pointers (e.g. URLs or other identifiers) that may indicate where the client 110 may obtain requested content. At step 512, the method 500 may include receiving a request for content from the client 110. In certain embodiments, the request for the content may be transmitted by the client 110, the first user device 102, the second user device 115, any combination thereof, or by any other appropriate device. In certain embodiments, the request for the content may be received by the servers 140, 145, 150, 160, any combination thereof, or by any other appropriate device.

At step 514, the method 500 may include redirecting the request for the content to the client proxy 106. In certain embodiments, the request may be received at the client proxy 106 without having to rely on a manifest file, and the request may be automatically sent from the client 110 directly to the client proxy 106. In one embodiment, the client proxy 106 may have the content already stored in a cache 166 of the client proxy 106. In another embodiment, the client proxy 106 may retrieve the content from the communications network 135 upon receiving the redirected request for content or at any other selected time. If the content is not already cached on the client proxy 106, the method 500 may include, at step 516, selecting, by utilizing the client proxy 106, one or more content delivery methods and/or networks based on one or more network conditions occurring in the system 100, the communications network 135, or any combination thereof. For example, the content delivery method may include, but is not limited, to a unicast delivery method, a multicast delivery method, an automatic multicast tunneling delivery method, and an eMBMS delivery method. The selected networks may include any of the types of networks disclosed herein or otherwise available. At step 518, the method 500 may include obtaining, via the client proxy 106, the requested content by utilizing the selected content delivery methods and/or networks. Once the content is obtained via the selected content delivery methods and/or networks, the method 500 may include, at step 520, caching the obtained content in a cache, such as cache 166, for storage. At step 522, the method 500 may include providing the obtained content to the client 110 by utilizing the client proxy 106. Notably, the method 500 may incorporate any of the functionality of the system 100 or any other functionality described in the present disclosure.

Notably, the system 100 and methods disclosed herein may include additional functionality and features. In certain embodiments, for example, the system 100 and methods may include enabling the client proxy 106 to listen to a multicast or other communications channel for triggers, control information, or other information associated with a network service. The triggers, control information and/or other information may be provided and regulated by the network service client proxy control device 130 or by another appropriate device in the system 100. In certain embodiments, the triggers, control information, and/or other information may include, but are not limited to, instructions indicating that the client proxy 106 should preload content, instructions to delete content stored in the cache 166 of the client proxy 106, instructions to reconfigure the cache 166, information indicating that emergency information and/or content should be sent to the clients 110, 118 by the client proxy 106, information indicating that a particular delivery method should be used at a particular time, information indicating that different policies 162 should be utilized for client 110 when compared with policies 162 for client 118, information indicating that policies 162 should be different for first user device 102 when compared with policies 162 for second user device 115 based on the technical specifications of the first and second user devices 102, 115, or any combination thereof.

In certain embodiments, the client proxy 106 may expose APIs to the clients 110, 118 to not only provide content preload scheduling capabilities, but also to deliver requested content at a time specified by the clients 110, 118, establish peer connections to any other device in the system 100, establish peer connections over short-range wireless communications technologies such as Bluetooth, or any other desired capabilities. In certain embodiments, the client proxy 106 may switch between delivery methods based on policies 162, while also remaining transparent to the clients 110, 118. The client proxy 106 may maintain desired adaptive bit rates, deadlines, and other requirements that may be made by the clients 110, 118. In certain embodiments, the client proxy 106 may be utilized to provide hyper-targeted advertisements or other content to each client 110, 118 based on the what type of device the clients 110, 118 are associated with, the type of users that are using the clients 110, 118, based on usage patterns associated with the clients 110, 118, based on location information associated with the user 101 and/or the first and second user devices 102, 115, or any combination thereof. The advertisements or other content may be preloaded in the cache 166 without having to first receive a request for content from the clients 110, 118 or a request for a network service. Once the advertisements or other content are preloaded, the client proxy 106 may provide the advertisements or other content to the clients 110, 118 at a desired time. In certain additional embodiments, the client proxy 106 may also serve as a library of a stand-alone service or for a plurality of services. The client proxy 106 may also allow for digital signage, time-shifting of delivery of content, and network offload capabilities. Time-shifting, for example, may be accomplished by the client proxy 106 by preloading content at an appropriate time and issuing a trigger to the clients 110, 118.

Figure 6:
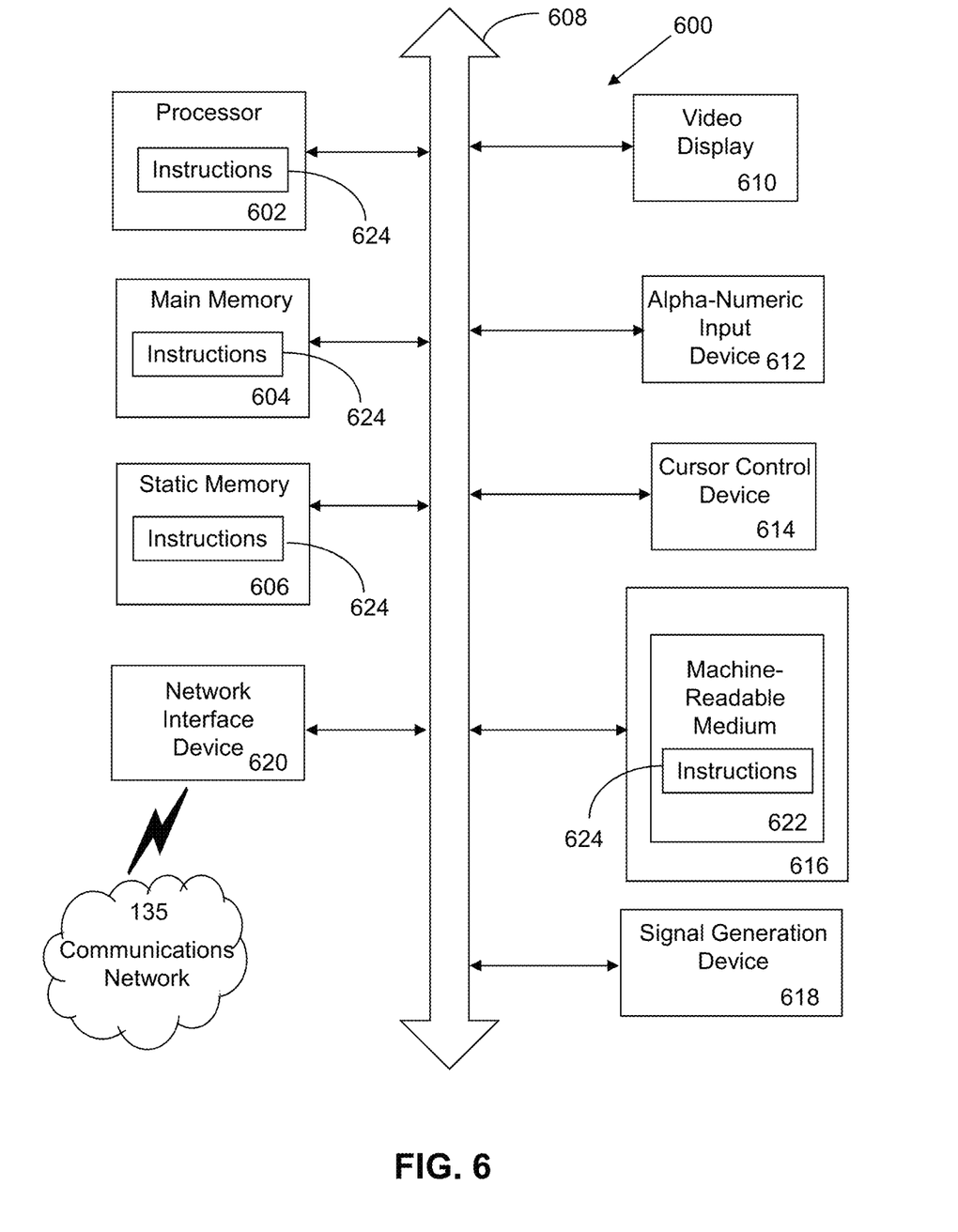
FIG. 6 is a schematic diagram of a machine in the form of a computer system within which a set of instructions, when executed, may cause the machine to perform any one or more of the methodologies or operations of the systems and methods for providing a multi-delivery-method policy-controlled client proxy.

Referring now also to FIG. 6, at least a portion of the methodologies and techniques described with respect to the exemplary embodiments of the system 100 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines, such as, but not limited to, first user device 102, the second user device 115, the eMBMS broadcast device 124, the unicast edge device 126, the multicast source device 128, the network service client proxy control device 130, the server 140, the server 145, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, other network, or both, can send or receive voice, video or data, and to communicate over the communications network 135, other network, or both, using the instructions. The instructions 624 may further be transmitted or received over the communications network 135, other network, or both, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions;
a processor that executes the instructions to perform operations, the operations comprising:
receiving, from a client, a request for a network service;

detecting, based on the request for the network service, a client proxy associated with the client, wherein the client proxy is detected based on a port at which the client proxy executes on a device that is executing the client;
providing, to the client, a data object including information indicating that the client proxy is a primary source for content requested by the client;
redirecting a request for the content from the client to the client proxy, wherein the request for the content is redirected based on the data object;
obtaining, via the client proxy, the content by utilizing a delivery method that is selected based on a policy, wherein the content is obtained by the client proxy when a power level of the device specified by the policy is at a threshold level; and
providing, via the client proxy, the content to the client.

2. The system of claim 1, wherein the operations further comprise selecting, via the client proxy, the delivery method based on the policy, wherein the policy is controlled by a content delivery provider associated with the client proxy.

3. The system of claim 2, wherein the operations further comprise receiving a new policy for replacing the policy, and wherein the operations further comprise selecting a different delivery method based on the new policy.

4. The system of claim 1, wherein the operations further comprise not redirecting the request for the content from the client to the client proxy if the client proxy is not detected.

5. The system of claim 4, wherein the operations further comprise providing, via a content delivery provider, the content to the client if the client proxy is not detected.

6. The system of claim 1, wherein the operations further comprise caching, by utilizing the client proxy, the content after the content is obtained by utilizing the delivery method.

7. The system of claim 1, wherein the operations further comprise receiving a report associated with a user experience with the client proxy.

8. The system of claim 1, wherein the operations further comprise changing the delivery method based on a change in a network condition specified in the policy.

9. The system of claim 1, wherein the operations further comprise installing and updating the client proxy on the client.

10. A method, comprising:
receiving, from a client, a request for a network service;
detecting, based on the request for the network service, a client proxy associated with the client, wherein the client proxy is detected based on a port at which the client proxy executes on a device that is executing the client;
providing, to the client, a data object including information indicating that the client proxy is a primary source for content requested by the client;
redirecting, by utilizing instructions from memory that are executed by a processor, a request for the content from the client to the client proxy, wherein the request for the content is redirected based on the data object;
obtaining, via the client proxy, the content by utilizing a delivery method that is selected based on a policy, wherein the content is obtained by the client proxy when a power level of the device specified by the policy is at a threshold level; and
providing, via the client proxy, the content to the client.

11. The method of claim 10, further comprising selecting, via the client proxy, the delivery method based on the policy, wherein the policy is controlled by a content delivery provider associated with the client proxy.

12. The method of claim 11, further comprising receiving a new policy for replacing the policy, and further comprising selecting a different delivery method based on the new policy.

13. The method of claim 10, further comprising not redirecting the request for the content from the client to the client proxy if the client proxy is not detected.

14. The method of claim 13, further comprising providing, via a content delivery provider, the content to the client if the client proxy is not detected.

15. The method of claim 10, further comprising obtaining portions of the content by utilizing adaptive-bit-rate switching.

16. The method of claim 10, further comprising exposing an application programming interface to the client, wherein the application programming interface enables scheduling of preloading of additional content.

17. The method of claim 10, further comprising preloading, at the client proxy, additional content for the client, wherein the additional content is preloaded at the client proxy prior to receiving the request for the content.

18. The method of claim 10, further comprising installing and updating the client proxy on the client.

19. A computer-readable device comprising instructions, which when executed by a processor, cause the processor to perform operations comprising:
receiving, from a client, a request for a network service;
detecting, based on the request for the network service, a client proxy associated with the client, wherein the client proxy is detected based on a port at which the client proxy executes on a device that is executing the client;
providing, to the client, a data object including information indicating that the client proxy is a primary source for content requested by the client;
redirecting a request for the content from the client to the client proxy, wherein the request for the content is redirected based on the data object;
obtaining, via the client proxy, the content by utilizing a delivery method that is selected based on a policy, wherein the content is obtained by the client proxy when a power level of the device specified by the policy is at a threshold level; and
providing, via the client proxy, the content to the client.

20. The computer-readable device of claim 19, wherein the operations further comprise selecting, via the client proxy, the delivery method based on the policy, wherein the policy is controlled by a content delivery provider associated with the client proxy.

* * * * *